(12) United States Patent
Matsumiya et al.

(10) Patent No.: US 11,407,461 B2
(45) Date of Patent: Aug. 9, 2022

(54) ATTACHING DOORS TO VEHICLES

(71) Applicant: Gordon Murray Design Limited, Shalford (GB)

(72) Inventors: Takeshi Matsumiya, Shalford (GB); Tim Fegan, Shalford (GB)

(*) Notice: Subject to any disclaimer, the term of this patent is extended or adjusted under 35 U.S.C. 154(b) by 90 days.

(21) Appl. No.: 16/764,447

(22) PCT Filed: Nov. 12, 2018

(86) PCT No.: PCT/EP2018/080985
§ 371 (c)(1),
(2) Date: May 15, 2020

(87) PCT Pub. No.: WO2019/096752
PCT Pub. Date: May 23, 2019

(65) Prior Publication Data
US 2020/0361551 A1   Nov. 19, 2020

(30) Foreign Application Priority Data
Nov. 17, 2017   (GB) ...................... 1719116

(51) Int. Cl.
*B62D 65/06*   (2006.01)
*B62D 24/00*   (2006.01)

(52) U.S. Cl.
CPC ............. *B62D 65/06* (2013.01); *B62D 24/00* (2013.01)

(58) Field of Classification Search
CPC ........ B60J 5/0463; B60J 5/107; B60J 5/0468; B60J 5/101; B60J 5/0406; B60J 5/0469;
(Continued)

(56) References Cited

U.S. PATENT DOCUMENTS 4,831,710 A    5/1989  Katoh et al.
6,000,748 A *  12/1999  Tomforde .............. B62D 65/06
                                                        296/202
(Continued)

FOREIGN PATENT DOCUMENTS

DE        19702543       8/1997
DE      102005022468    11/2006
(Continued)

OTHER PUBLICATIONS

European Patent Office, International Search Report for PCT/EP2018/080985, dated Mar. 11, 2019.
(Continued)

*Primary Examiner* — Jason L Vaughan
*Assistant Examiner* — Amanda Kreiling
(74) *Attorney, Agent, or Firm* — Giordano Law LLC; David A. Giordano

(57) ABSTRACT

A method of assembling a vehicle is disclosed, comprising the steps of (in sequence) providing a chassis structure, affixing a door inner panel to the chassis structure via a hinged attachment, at a location adjacent to a door opening defined by the chassis structure, attaching at least one external body panel to the chassis structure, attaching a door outer panel to the door inner panel via an adhesive fixing. In this way, the door inner panel can be attached in place during the build, at a position tailored to the needs of the seals provided between the door and the chassis structure. Production of the vehicle can continue, and in due course the exterior body panels can be fitted to the chassis structure. The door outer panel can then be attached to the door inner panel, using the tolerance in the adhesive attachment to adjust for panel gap and flushness of fit. The application also relates to a vehicle made in this way.

12 Claims, 5 Drawing Sheets

(58) Field of Classification Search
CPC .............. B60J 5/102; Y10T 29/49895; Y10T 29/49622; Y10T 29/49623; Y10T 29/49826; Y10T 29/49904
See application file for complete search history.

(56) References Cited

U.S. PATENT DOCUMENTS

| | | | |
|---|---|---|---|
| 9,981,535 B2* | 5/2018 | Ueno | .............. B60J 5/101 |
| 2015/0352934 A1 | 12/2015 | Mildner et al. | |
| 2017/0066306 A1 | 3/2017 | Ueno et al. | |

FOREIGN PATENT DOCUMENTS

| | | |
|---|---|---|
| EP | 1131241 | 9/2001 |
| EP | 1459964 | 9/2004 |
| FR | 2886268 | 12/2006 |
| JP | H01314676 | 12/1989 |
| JP | H5017150 | 1/2001 |
| JP | 2013006437 | 10/2013 |
| WO | 2014009271 | 1/2014 |

OTHER PUBLICATIONS

European Patent Office, Written Opinion for PCT/EP2018/080985, 2019.
Intellectual Property Office of the United Kingdom, Search Report for Application No. GB1719116.4, dated May 4, 2018.

* cited by examiner

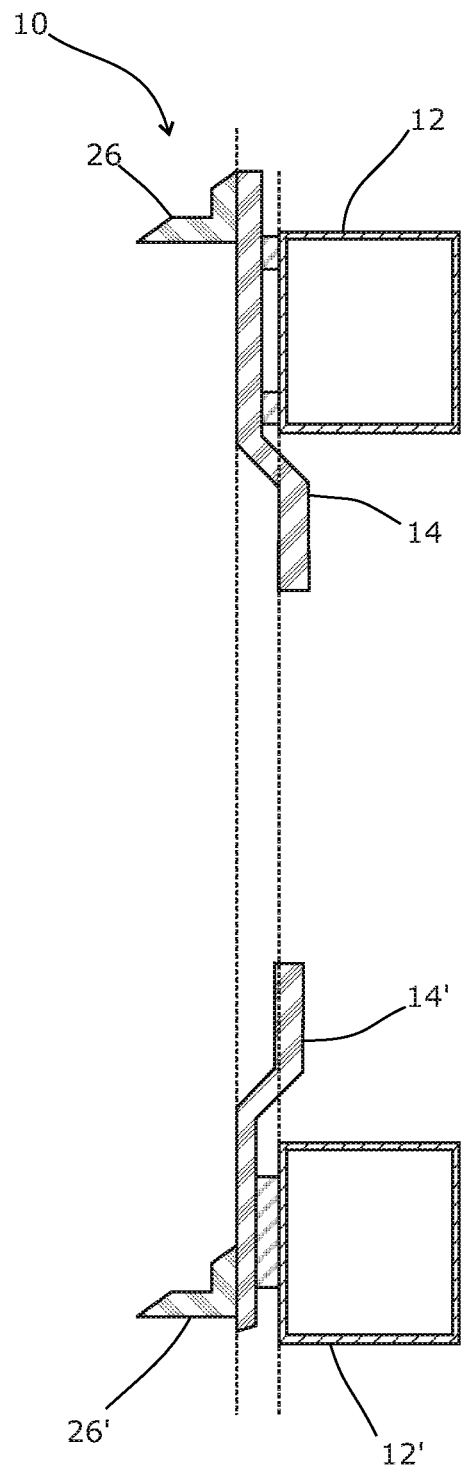
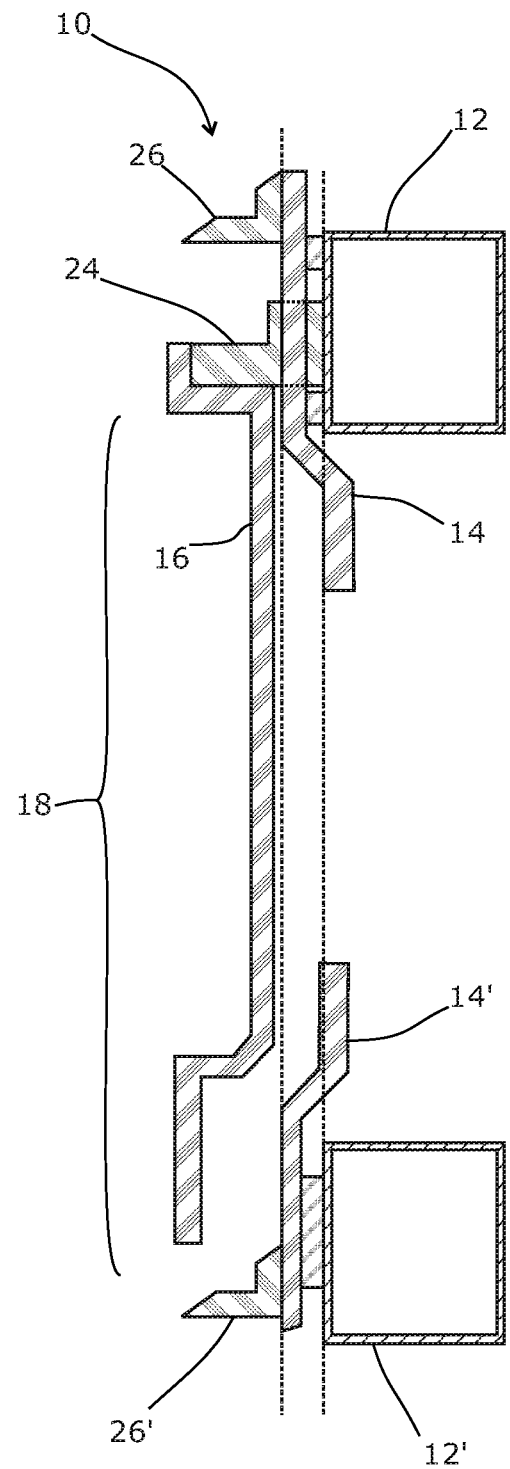
Fig 1
Fig 2

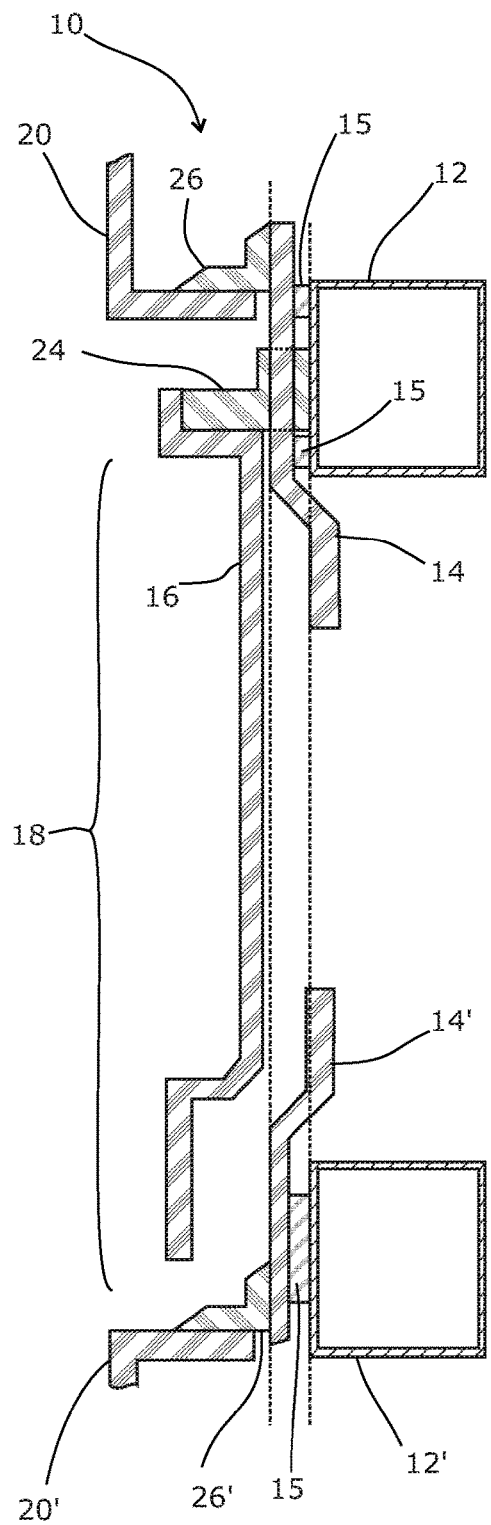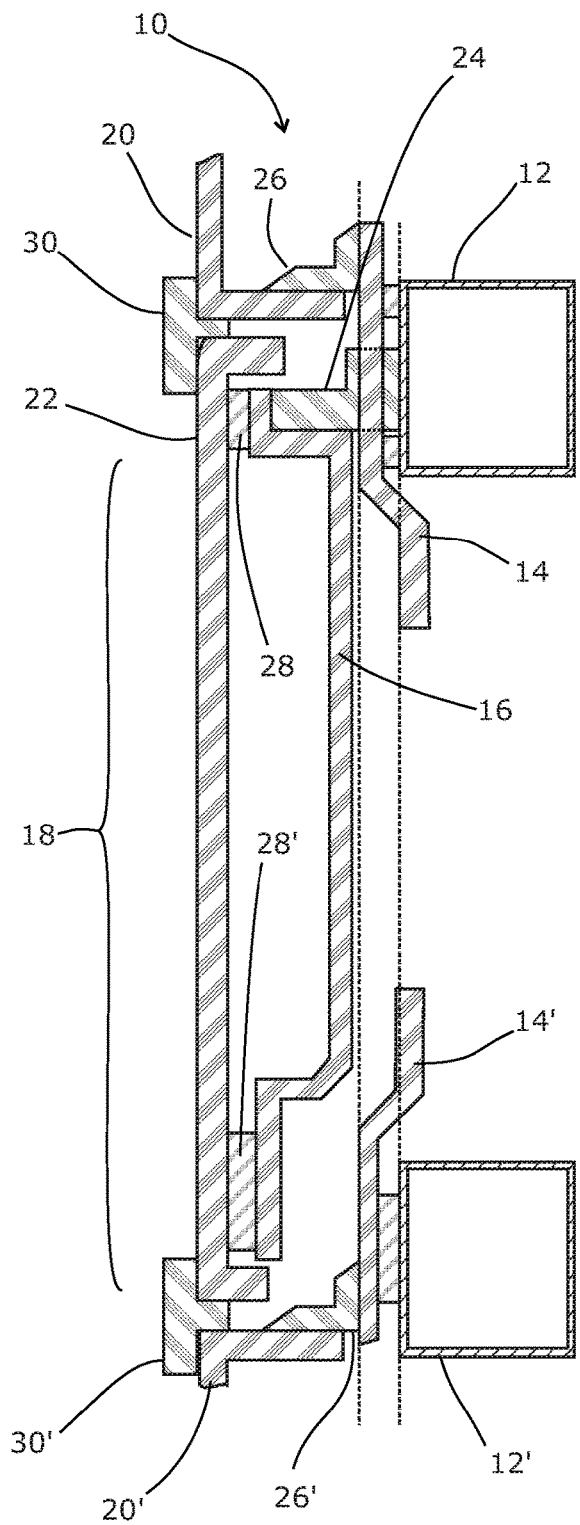
Fig 3
Fig 4

ATTACHING DOORS TO VEHICLES

FIELD OF THE INVENTION

The present invention relates to the attachment of a vehicle door to a vehicle, and to the nature of the vehicle door.

BACKGROUND ART

An important aspect of a new-build vehicle (other than safety, performance, etc) is its appearance, including presentational details such as consistent panel gaps and flush fitting of external panels.

In a conventional vehicle body, the rear bumper or fender is usually part of the body frame structure. Thus, when the door is attached its mounting needs to be adjusted to match with the rear body panels, so as to be flush and maintain a small and consistent panel gap. The front bumper or fender is typically attached to the body subsequently, after which the front fender then needs to be adjusted relative to the door, again to give a flush fitting and consistent gap. The door seal is then attached to the door opening flange (as known as the AB flange, as it extends from the A pillar to the B pillar) on the body to stop water ingress.

To ensure that the door seal is effective, it is necessary to ensure that the gap between the door and the door opening flange is within tolerance. This means that door setting has to be a compromise, to have both a good gap for the seal and good panel gap and flushness. A seal gap that is too wide will result in an ineffective seal, allowing water ingress. A seal gap that is too small will require the seal to be over-compressed when the door is closed, resulting in an increase in the effort required to close the door.

SUMMARY OF THE INVENTION

The present invention therefore provides a method of assembling a vehicle, comprising the steps of providing a chassis structure, affixing a door structure to the chassis structure via a hinged attachment at a location adjacent to a door opening defined by the chassis structure, attaching a door outer panel to the door structure, and attaching at least one external body panel to the chassis structure, wherein the last to be attached of the door outer panel and the external body panel is attached and, during attachment, is aligned relative to the other.

The door structure can be fixed to the chassis structure via a mechanical attachment such as a bolted connection, to provide the necessary mechanical strength and (preferably) allow for removal later if needed during the vehicle life. It preferably covers at least part of the door opening, ideally the periphery of the door opening thus allowing it to carry a seal which, when the door is closed, seals against the chassis structure. The chassis structure may also have a seal which, when the door is closed, seals against the door structure.

The chassis structure can comprise a chassis and at least one intermediate panel, wherein the intermediate panel is affixed to the chassis via an adhesive fixing. The intermediate panel can then provide an accurate datum notwithstanding tolerances in the chassis. Mechanical attachments, such as of the door itself, can made to the underlying chassis, but can also be aligned and positioned with assistance from the intermediate panel or formations therein.

The steps are preferably carried out in the order of providing the chassis structure, attaching the door outer panel to the door structure, affixing the door structure to the chassis structure, attaching the at least one external body panel to the chassis structure and, during attachment, aligning the external body panel relative to the door outer panel. To assist in this process, one or more jig parts can be attached to or in contact with the external body panel while it is being attached; these can be removed after the external body panel has been attached.

Alternatively, the steps can be carried out in the order of providing the chassis structure, affixing the door structure to the chassis structure, attaching the at least one external body panel to the chassis structure, attaching the door outer panel to the door structure and, during attachment, aligning the door outer panel relative to the external body panel. In this way, the door inner panel can be attached in place during the build, at a position tailored to the needs of the seals provided between the door and the chassis structure. Production of the vehicle can continue, and in due course the exterior body panels can be fitted to the chassis structure. The door outer panel can then be attached to the door inner panel via an adhesive fixing; this allows use of the tolerance in the adhesive attachment to adjust for panel gap and flushness of fit. The use of adhesive allows for precise adjustment of the door outer panel. To assist in this process, one or more jig parts can be attached to or in contact with the door outer panel while it is being attached; these can be removed after the door outer panel has been attached.

The chassis structure can include a chassis over which are fitted one or more intermediate panels, for example as set out in our earlier application WO2014/009271. These can be fixed to the chassis via a mechanical attachment or adhesively. An intermediate panel preferably covers at least the periphery of the door opening, as it can then carry a seal which, when the door is closed, seals against the door inner. The intermediate panel is preferably affixed to the chassis via an adhesive fixing; as set out in our earlier application WO2014/009271, this allows the intermediate panel to be positionally set to a chosen datum notwithstanding tolerances in an underlying chassis. The chassis itself may be a framework of interconnected tubular members, ideally including panels attached to the frame, each panel being attached to a plurality of tubular members so as to bridge a space between tubular members as set out in our earlier application WO2009/122178.

The present invention also provides a vehicle comprising a chassis structure, a door inner panel attached to the chassis structure via a hinged attachment at a location adjacent to a door opening defined by the chassis structure, an external body panel to the intermediate panel, and a door outer panel distinct from but attached to the door inner panel via an adhesive fixing. Such a vehicle may also include the other preferred features set out above.

BRIEF DESCRIPTION OF THE DRAWINGS

An embodiment of the present invention will now be described by way of example, with reference to the accompanying figures in which;

FIGS. 1 to 4 show in a schematically-illustrated horizontal section, the sequential steps in assembling a vehicle and door, according to a first embodiment of the present invention;

DETAILED DESCRIPTION OF THE EMBODIMENTS

Figure 5:
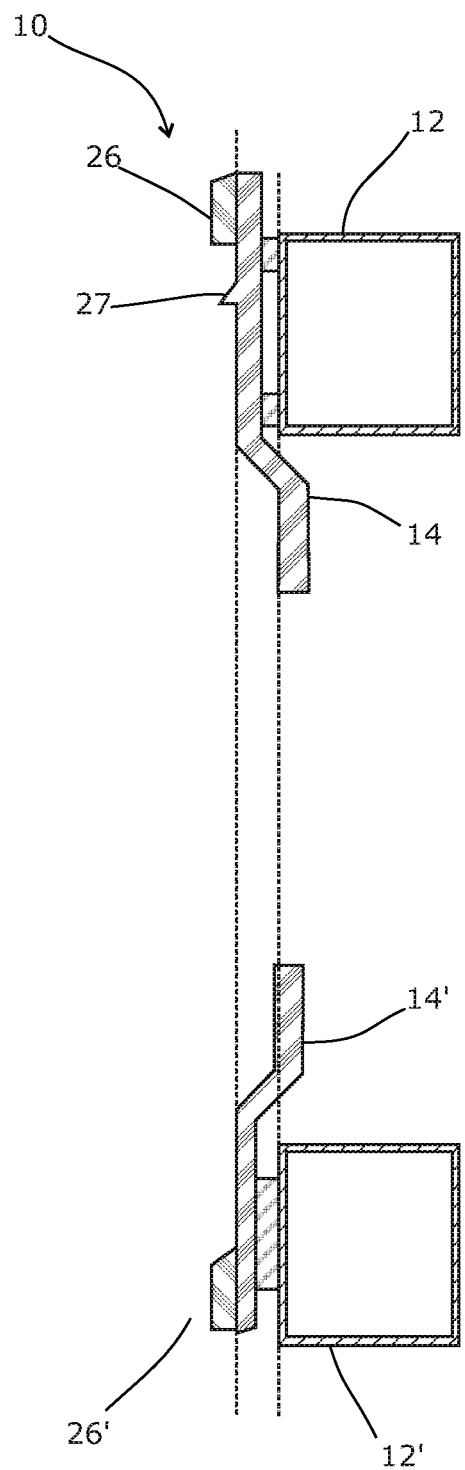
FIGS. 5 to 7 show a like sequence of sections illustrating the steps in assembling a vehicle and door, according to a second embodiment of the present invention

FIG. 1 shows part of a vehicle to be assembled by a method according to a first embodiment of the present invention, as a schematically-illustrated horizontal section of a portion of such a vehicle at an early stage of the method. The portion 10 of the vehicle has tubular pillars 12, 12' forming part of a chassis. This may be augmented by other tubular sections, and/or one or more reinforcing panels to transfer forces between the tubular sections, as set out in our earlier application WO2009/122178. Alternatively, the chassis may be conventional in nature. Parts of an intermediate panel 14, 14' are affixed to the chassis, as set out in our earlier application WO2014/009271; the rest of the intermediate panel is not shown so as to aid clarity. The chassis and the intermediate panel together define a chassis structure for the vehicle. Attachments 26, 26' are provided on the intermediate panel to allow or assist with subsequent connection to further elements, and/or to assist in locating those elements accurately. The attachments 26, 26' are shown as being attached to the intermediate panel 14, but may preferably be integrally formed with it instead.

As explained in WO2014/009271, the intermediate panel 14 is attached to the chassis by an adhesive layer 15, 15' which has a nominal thickness which is adequate to accommodate constructional tolerances in the precise position of the tubular pillars 12, 12'. Thus, the tubular sections can be assembled into a framework by CNC cutting, bending and welding techniques to millimetre tolerances, and the intermediate panels attached either via a jig (thereby providing a fixed datum point) or by an automated handling device. The result is one or more intermediate panels that are at a known datum position.

FIG. 2 shows the portion 10 shown in FIG. 1 to which a door inner panel 16 has been affixed to the chassis 12, by way of a hinged attachment 24. The door inner panel 16 is located adjacent a door opening 18. The hinged attachment 24 can be fixed to the chassis tubes 12 or to the intermediate panel 14, but we prefer the former as this fixes the hinged attachment 24 to a structural element.

FIG. 3 shows the portion 10 shown in FIG. 2 to which external body panels 20, 20' have been attached by way of the attachments 26, 26'. Again, as these are attached to the intermediate panel 14, either indirectly (as shown) or directly, they are located relative to a known datum and hence it is possible to be confident as to their positioning.

FIG. 4 shows a final step, being the attachment of a door outer panel 22. This is adhesively bonded to the door inner panel 16 via adhesive layers 28, 28'. In the same manner as fitting the intermediate panel to the chassis, these adhesive layers 28, 28' are sufficiently thick to accommodate positional tolerances and thus the door outer panel 22 can be located precisely relative to the external body panels 20 which have already been fitted to the vehicle. Jig parts 30, 30' may be attached to the door outer panel 22 to assist during the assembly process, while the door outer panel 22 is being attached to the door inner panel 16. These jig parts 30, 30' comprise a tongue extending into the gap between the door outer panel 22 and the external body panels 20, to set the panel gap between them. They also comprise a ledge which is set level with the external face of the door outer panel 22, positioned to abut against the relevant external body panel 20 and ensure that the door outer panel 22 is set at the correct depth to be flush with the surrounding panels.

The end result is a door comprising an inner panel whose position is fixed relative to the datum and which hence is ideally positioned for the door seals, and an outer panel which is positioned accurately relative to the surrounding body panels, flush and with good panel gaps.

Figure 6:
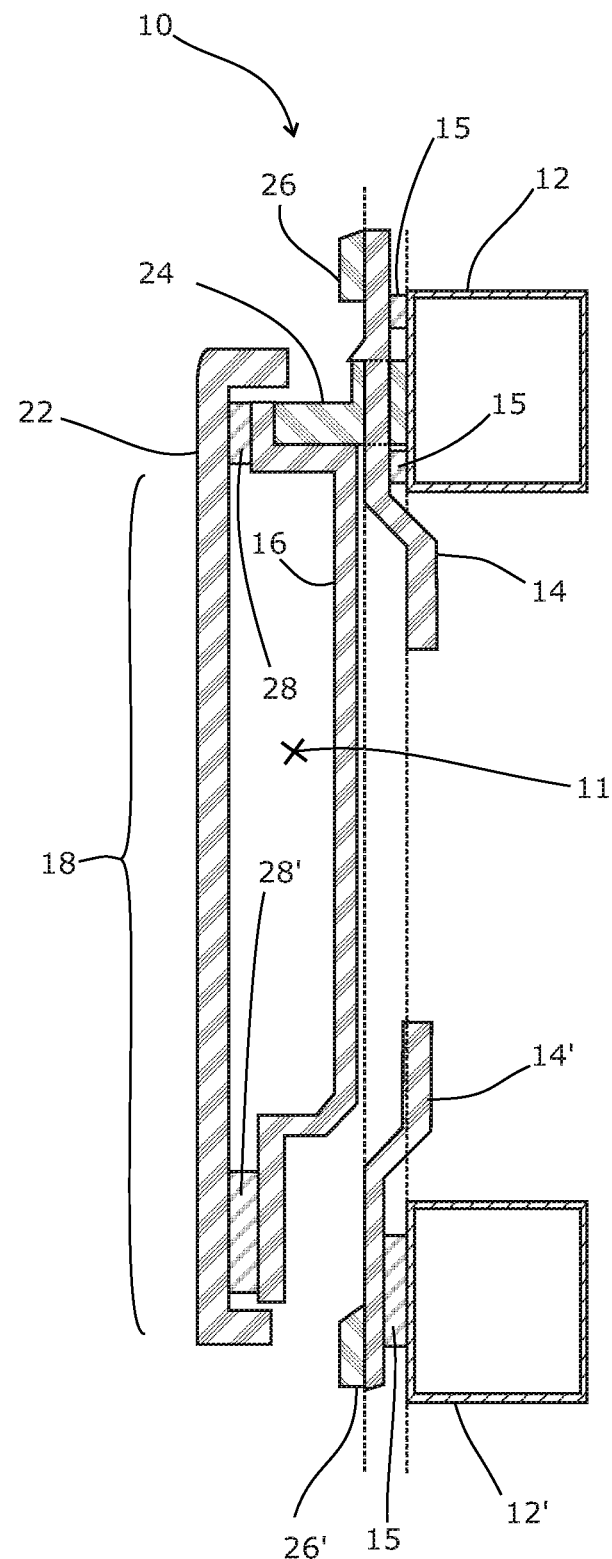
Figure 7:
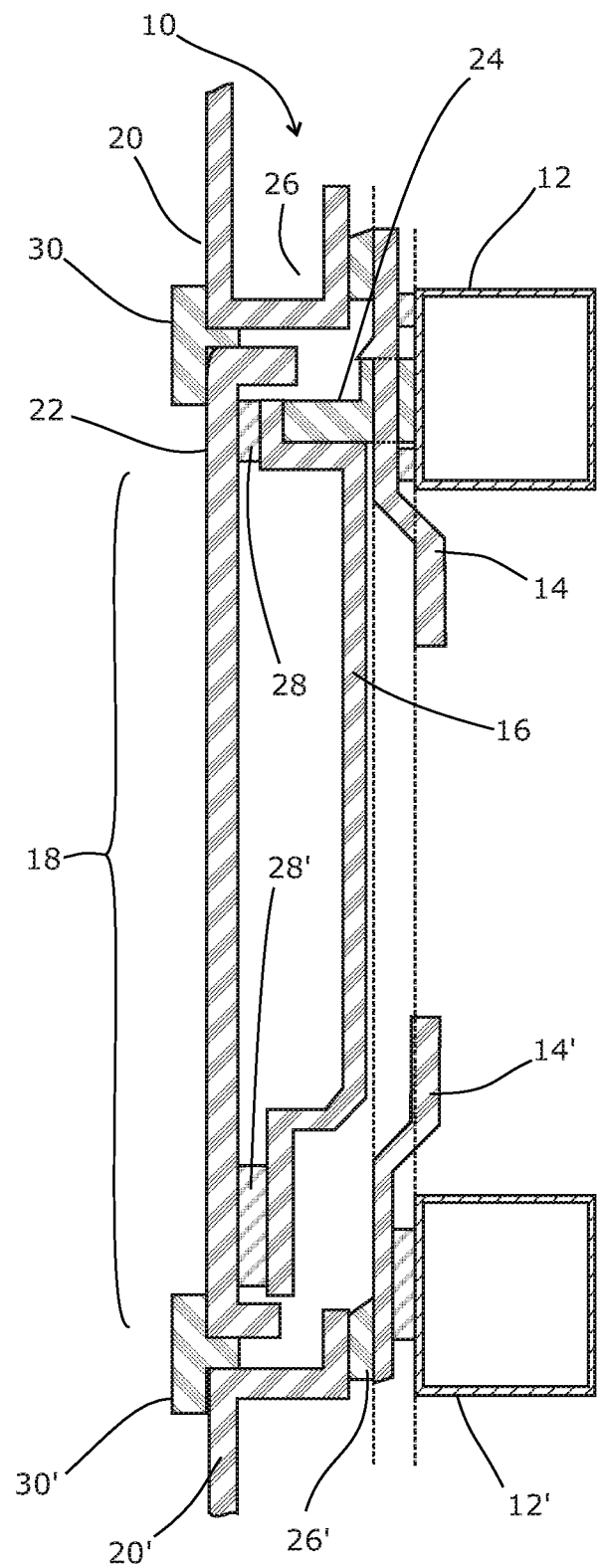

FIGS. 5 to 7 illustrate a method according to a second embodiment. Many of the elements of the door are the same and therefore like reference numerals are employed in order to denote like parts. FIG. 5 shows a schematically-illustrated horizontal section of a portion of such a vehicle at an early stage of the method, in the same layout as FIG. 1. Again, this portion 10 of the vehicle has tubular pillars 12, 12' forming part of a chassis. Parts of an intermediate panel 14, 14' are affixed to the chassis; the rest of the intermediate panel is not shown so as to aid clarity. Attachments 26, 26', 27 are provided on the intermediate panel 14, being present for subsequent connection to further elements and to assist in locating those elements accurately. As described in relation to the first embodiment, the intermediate panel provides a known datum position for the parts to be attached to it.

FIG. 6 shows the portion 10 shown in FIG. 5 to which a pre-formed door 11 has been attached to the chassis 12 by way of a hinged attachment 24, using a formation 27 on the integration panel 14 to obtain an accurate position. The door broadly comprises an inner panel 16 and an outer panel 22 which are adhesively bonded via adhesive layers 28, 28'. This is done away from the chassis 12 on a suitable jig to ensure that the door 11 is built accurately (including the hinged attachments 24) to pre-determined dimensions. The door 11 is thus located adjacent a door opening 18. The hinged attachment 24 can be fixed to the chassis tubes 12 or to the intermediate panel 14, but we prefer the former as this fixes the hinged attachment 24 to a structural element. Once the pre-formed door is attached to the intermediate panel, the door will be at a predetermined position relative to the intermediate panel, including both the inner and outer door panels 16, 22. Thus, the door seals will be at a known spacing dictated by the position of the door inner panel 16 relative to the intermediate panel 14. Likewise, the door outer panel will be at a known position.

FIG. 7 shows a final step, being the attachment of the external body panels 20, 20' to the intermediate panel 14, by way of mechanical fixing or adhesive bonding to the door inner panel. Jig parts 30, 30' may be attached to the door outer panel 22 and/or to the external body panels 20 to assist during the assembly process, while the external body panels 20 are being attached to the intermediate panel 14. The mechanical fixings should be ones that allow for fine adjustment of the panel position, so that it can be positioned accurately relative to the door panel.

The end result is, again, a door comprising an inner panel whose position is fixed relative to the datum and which hence is ideally positioned for the door seals, and an outer panel which is positioned accurately relative to the surrounding body panels, flush and with good panel gaps.

The fixings and attachments 24, 26, 26', 28, 28', 30, 30' are shown in a simplified form to aid clarity, but in practice may be mechanical attachments of various types including hinged attachments and/or adhesive fixings.

The hinged attachments 24 may simply be hinges, ready to be attached to the chassis or intermediate panel. Such hinges will usually comprise two hinge plates with a rotational connection between them. One plate therefore attaches to the door structure and one to the chassis. Either or both plate may be integrated into the chassis or the door panels, respectively. Where multiple hinges are used, these may be attached separately, or they may use one or more shared hinge plates, or one or more subframes may be provided, to which the hinge plates can be attached and which can itself eventually be attached to the tubular pillar 12 or to the remainder of the door structure (as appropriate).

Figure 8:
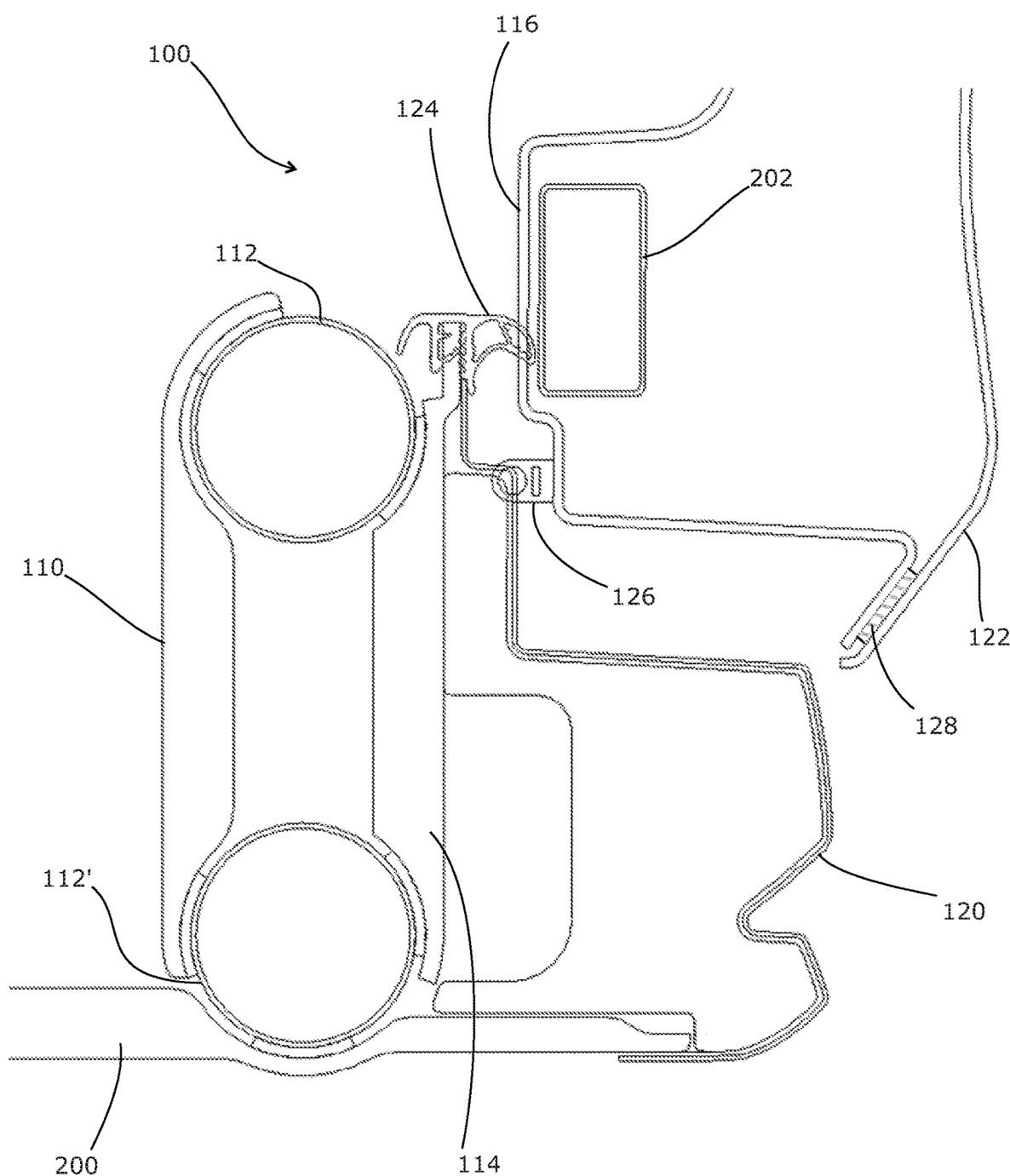
FIG. 8 shows a vertical section through an embodiment of the present invention, fully assembled.

FIG. 8 shows part of an alternative vehicle assembled according to the method of the present invention, as a vertical section through a portion of such a vehicle showing the bottom part of the door. The portion 100 has tubular sections 112, 112'; together with reinforcement panels 110 adhesively bonded to the tubular sections, these form part of a chassis to each of which an intermediate panel 114 is affixed. An external body panel 120 is also attached to the intermediate panel 114. A first seal 124 is attached to the intermediate panel 114 and a second seal 126 is attached to the door inner panel 116 so that when the vehicle door is closed (as depicted in FIG. 8, for example) a seal is formed between the door inner panel 116 and the external body panel 120. A door outer panel 122 is attached to the door inner panel 116 by way of an adhesive connection 128. Also shown in FIG. 8 are parts of a vehicle which are included for completeness but which do not related directly to the present invention, such as a floor 200 of the vehicle and a door frame 202.

It will of course be understood that many variations may be made to the above-described embodiment without departing from the scope of the present invention.

The invention claimed is:

1. A method of assembling a vehicle, comprising the steps of:
   providing a chassis structure;
   affixing a door structure to the chassis structure via a hinged attachment at a location adjacent to a door opening defined by the chassis structure;
   attaching a door outer panel to the door structure via an adhesive;
   attaching at least one external body panel to the chassis structure;
   wherein the last to be attached of the door outer panel and the external body panel is attached and, during attachment, is aligned relative to the other, wherein the adhesive accommodates constructional tolerances.

2. The method according to claim 1 in which door structure covers at least part of the door opening.

3. The method according to claim 2 in which the chassis structure has a seal which, when the door is closed, seals against the door structure.

4. The method according to claim 1 in which the door structure covers at least the periphery of the door opening.

5. The method according to claim 4 in which the door structure has a seal which, when the door is closed, seals against the chassis structure.

6. The method according claim 1 in which the chassis structure comprises a chassis and at least one intermediate panel, wherein the intermediate panel is affixed to the chassis via an adhesive fixing.

7. A method of assembling a vehicle comprising steps carried out in the order:
   providing a chassis structure;
   attaching a door outer panel to a door structure;
   affixing the door structure to the chassis structure via a hinged attachment at a location adjacent to a door opening defined by the chassis structure;
   attaching at least one external body panel to the chassis structure and, during attachment, aligning the external body panel relative to the door outer panel.

8. The method according to claim 7 in which at least one jig part is in contact with the external body panel while the external body panel is being attached.

9. A method of assembling a vehicle comprising steps carried out in the following order:
   providing a chassis structure;
   affixing a door structure to the chassis structure via a hinged attachment at a location adjacent to a door opening defined by the chassis structure;
   attaching at least one external body panel to the chassis structure;
   attaching a door outer panel to the door structure and, during attachment, aligning the door outer panel relative to the external body panel.

10. The method according to claim 9 in which the door outer panel is attached to the door structure via an adhesive fixing.

11. The method according to claim 10 in which the chassis structure includes, or the chassis is, a framework of interconnected tubular members.

12. The method according to claim 11 in which the chassis structure or the chassis includes panels attached to the framework, each panel being attached to a plurality of tubular members so as to bridge a space between tubular members.

* * * * *